US012753821B2

(12) United States Patent
Semperlotti et al.

(10) Patent No.: US 12,753,821 B2
(45) Date of Patent: Oct. 6, 2026

(54) VIBRATION ATTENUATION VIA TAILORED METASTRUCTURES

(71) Applicant: Purdue Research Foundation, West Lafayette, IN (US)

(72) Inventors: Fabio Semperlotti, West Lafayette, IN (US); Mehdi Jokar, Riverside, RI (US); Siddharth Nair, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 632 days.

(21) Appl. No.: 18/217,539

(22) Filed: Jul. 1, 2023

(65) Prior Publication Data

US 2024/0003403 A1 Jan. 4, 2024

Related U.S. Application Data

(60) Provisional application No. 63/357,720, filed on Jul. 1, 2022.

(51) Int. Cl.

| | |
|---|---|
| ***F16F 15/02*** | (2006.01) |
| ***B32B 3/26*** | (2006.01) |
| ***B32B 7/022*** | (2019.01) |
| ***B32B 25/04*** | (2006.01) |
| ***B32B 27/08*** | (2006.01) |

(Continued)

(52) U.S. Cl.

CPC ............ *F16F 15/022* (2013.01); *B32B 3/263* (2013.01); *B32B 7/022* (2019.01); *B32B 25/04* (2013.01); *B32B 27/08* (2013.01); *B32B 27/40* (2013.01); *F16F 13/06* (2013.01); *B32B 2307/10* (2013.01); *B32B 2307/536* (2013.01);

(Continued)

(58) Field of Classification Search

None

See application file for complete search history.

(56) References Cited

U.S. PATENT DOCUMENTS 9,222,229 B1 * 12/2015 Chang .................. G10K 11/172
10,634,205 B2 4/2020 Wang et al.
2021/0054898 A1 2/2021 Cheng et al.

FOREIGN PATENT DOCUMENTS

CN 106023979 A * 10/2016 ........... G10K 11/172
CN 110094452 B 5/2021
CN 114619726 A * 6/2022 ............. B32B 15/04

OTHER PUBLICATIONS

CN-106023979-A: English Machine Translation (Year: 2016).*

(Continued)

*Primary Examiner* — Melanie Torres Williams

(74) *Attorney, Agent, or Firm* — Purdue Research Foundation

(57) ABSTRACT

The vibration attenuation system includes a load bearing layer, a non-load bearing layer, and a rigid beam connector. The load bearing layer has a first density and a first stiffness. The non-load bearing layer has a second density and a second stiffness. The second density is lower than the first density. The rigid beam connector has a third density and a third stiffness. The rigid beam connector couples the load bearing layer to the non-load bearing layer. The coupling of the non-load bearing layer to the load bearing layer is enabled through the use of the rigid beam connector which provides a nonlocal connection to transfer energy from the load bearing layer to the non-load bearing layer.

19 Claims, 9 Drawing Sheets

(51) Int. Cl.
*B32B 27/40* (2006.01)
*F16F 13/06* (2006.01)
(52) U.S. Cl.
CPC ....... *B32B 2307/54* (2013.01); *B32B 2307/72* (2013.01); *F16F 2224/025* (2013.01)

(56) References Cited

OTHER PUBLICATIONS

CN-114619726-A: English Machine Translation (Year: 2022).*
Krylov, V. et al., Acoustic 'black holes' for flexural waves as effective vibration dampers, Journal of Sound and Vibration, vol. 274, No. 3-5, pp. 605-619, 2004.
Zhao, L. et al., Embedded acoustic black holes for semi-passive broadband vibration attenuation in thin-walled structures, J. Sound Vib. 388 (2017) 42-52.
Pelat, F. et al., Passive control of vibrations using acoustic black holes, in: Inter-Noise and Noise-Con Congress and Conference Proceedings, vol. 255, Institute of Noise Control Engineering, 2017, pp. 5789-5798.
Tang, L. et al., Broadband locally resonant band gaps in periodic beam structures with embedded acoustic black holes, J. Appl. Phys. 121 (19) (2017) 194901.
Tang, L. et al., Ultrawide band gaps in beams with double-leaf acoustic black hole indentations, J. Acoust. Soc. Am. 142 (5) (2017) 2802-2807.
Ji, H. et al., Noise reduction inside a cavity coupled to a flexible plate with embedded 2-D acoustic black holes, J. Sound Vib. 455 (2019) 324-338.
Zhu, H. et al., Nonlocal elastic metasurfaces: Enabling broadband wave control via intentional nonlocality, Proc. Natl. Acad. Sci. 117 (42) (2020) 26099-26108.
Li, H. et al., Combining nonlinear vibration absorbers and the acoustic black hole for passive broadband flexural vibration mitigation, Int. J. Non-Linear Mech. 129 (2021) 103558.
Li, H. et al., Experimental evidence of energy transfer and vibration mitigation in a vibro-impact acoustic blackhole, Appl. Acoust. 182 (2021) 108168; available at https://www.sciencedirect.com/science/article/pii/S0003682X21002620.
Gao, N. et al., Low-frequency elastic wave attenuation in a composite acoustic black hole beam, Appl. Acoust. 154 (2019) 68-76.
Conlon, S. C. et al., Enhancing the low frequency vibration reduction performance of plates with embedded Acoustic Black Holes, in Inter-Noise and Noise Con 2014, Congress and Conference Proceedings, Melbourne Australia, vol. 249, No. 8. Institute of Noise Control Engineering, 2014, pp. 175-182.
Georgiev, V. et al., Damping of structural vibrations in beams and elliptical plates using the acoustic black hole effect, Journal of sound and vibration, vol. 330, No. 11, pp. 2497-2508, 2011.

* cited by examiner

| Design Nomenclature | CAD model | Design Nomenclature | CAD model |
|---|---|---|---|
| (a) Flat [B] |  | (d) Tapered [B] |  |
| (b) Top Flat Bottom Flat (TFBF) |  | (e) Top Flat Bottom Tapered (TFBT) |  |
| (c) Top Tapered Bottom Flat (TTBF) |  | (f) Top Tapered Bottom Tapered (TTBF) |  |

| Geometry | Density ($kg/m^3$) | Young's Modulus (GPa) | Poisson's ratio | Isotropic loss factor($\eta_s$) |
|---|---|---|---|---|
| LBL | 2700 | 79 | 0.33 | 0 |
| NLBL | 1000 | 2 | 0.35 | 0 |
| Connector | 10 | 1000 | 0.27 | 0 |
| Viscoleastic layer | 1000 | 0.1 | 0.45 | 0.1 |

FIG. 11

| Plate | Properties | Flat plate | TFBF | TTBF | Tapered plate | TFBT | TTBT |
|---|---|---|---|---|---|---|---|
| LBL | Width (m) | 1.4 | 1.4 | 1.4 | 1.4 | 1.4 | 1.4 |
| | Max Height (m) | 0.008 | 0.008 | 0.008 | 0.008 | 0.008 | 0.008 |
| | Min Height (m) | 0.008 | 0.008 | 0.008 | 0.0015 | 0.0015 | 0.0015 |
| | No. of Tapers | 0 | 0 | 0 | 10 | 10 | 10 |
| | Taper power-$m$ | - | - | - | 2.2 | 2.2 | 2.2 |
| NLBL | Width (m) | - | 1.39 | 1.39 | - | 1.39 | 1.39 |
| | Max Height (m) | - | 0.0033 | 0.008 | - | 0.0033 | 0.008 |
| | Min Height (m) | - | 0.0033 | 0.0012 | - | 0.0033 | 0.0012 |
| | No. of Tapers | - | 0 | 0 | - | 1 | 1 |
| | Taper power-$m$ | - | - | - | - | 2.2 | 2.2 |
| Connectors | Width (m) | - | 0.002 | 0.002 | - | 0.002 | 0.002 |
| | Height (m) | - | 0.012 | 0.012 | - | 0.0189 | 0.0189 |
| Viscoelastic layer | Width (m) | 1.09 | 1.09 | 1.09 | 1.09 | 1.09 | 1.09 |
| | Thickness (m) | 0.0075 | 0.0075 | 0.0075 | 0.0075 | 0.0075 | 0.0075 |

FIG. 12

VIBRATION ATTENUATION VIA TAILORED METASTRUCTURES

CROSS REFERENCE TO RELATED APPLICATIONS

The present application is a U.S. non-provisional application which claims the benefit of U.S. provisional application Ser. No. 63/357,720, filed Jul. 1, 2022, the content of which is incorporated by reference herein in its entirety.

GOVERNMENT RIGHTS

This invention was made with government support under 1621909 and 1761423 awarded by the National Science Foundation. The government has certain rights in the invention.

FIELD

The disclosure generally relates to vibration attenuation systems and, more particularly, to passive low frequency and broadband vibration attenuation systems.

INTRODUCTION

This section provides background information related to the present disclosure which is not necessarily prior art.

The ability to achieve broadband vibration attenuation has always been a long-standing challenge in the structural dynamics community. Active and semi-active techniques are capable of extending the operating range and providing some level of adaptation to specific operating conditions. However, they also impose more elaborate system configurations, typically involving added electronics and control logics that increase complexity, probability of false alarms and failure. Conversely, passive systems are simple, robust, and reliable but do not offer the same flexibility to different operating conditions and do not allow achieving broad operating ranges. The aerospace and automotive industries, which predominantly use lightweight structures, have struggled with attenuating low frequency vibrations. Low frequency flexural wave propagation through flexible lightweight structures may cause structural instability, structure radiated noise, and structural damage. The search for a vibration attenuation system capable of combining the benefits of both active and passive methods without inheriting the corresponding disadvantages has been a long-standing challenge in structural dynamics.

In recent years, Acoustic Black Holes (ABH) have rapidly emerged as an effective passive technique to either dissipate or harvest mechanical energy in thin wall structures. The characteristic dimension of an ABH (typically its diameter, in the case of an axisymmetric design) is strictly connected to its cut-on frequency, which is the value below which the ABH cannot affect (i.e., slow down) the incoming wave. From a general perspective, the lower the desired cut-on frequency, the larger the required diameter of the ABH.

This frequency condition is probably more conveniently restated in terms of a cut-on wavelength. Theoretical and experimental results have shown that in order for the ABH to interact with the incoming wave, the wavelength should be about the ABH diameter or smaller. However, design and manufacturing constraints impose stringent limitations on the maximum ABH diameter usable in practical applications, and consequently on the lowest achievable cut-on frequency. It follows that structures with embedded ABHs can perform well in the mid and high-frequency ranges (or, equivalently, the medium to short wavelengths), but perform poorly in the low frequency range (i.e., when wavelengths are longer than the ABH diameter).

Previous studies have explored the dynamic behavior of an ABH metastructure, that is a continuum thin-walled structure integrated with periodic arrangements of ABHs. These works explored the role that periodic arrangements of ABHs can play in tailoring the dispersion properties of the host structure and controlling the propagation of elastic waves. In a follow-up study, it was also shown that periodic ABH elements can also lead to metastructures with unusual effective material properties. Later, separate studies observed that the periodic arrangement of ABHs can introduce locally resonant bandgaps below the ABH cut-on frequency. The use of interconnected double ABH indentations was also explored as a way to couple local resonance and Bragg's scattering effects to widen bandgaps in frequency ranges below the cut-on frequency of the individual ABH.

While recent studies have recognized the potential of periodic arrangements of ABHs to achieve passive vibration attenuation at low frequency (that is below the cut-on frequency of the individual ABH unit), it was found that the overall dynamic performances were still limited by the number of unit cells in these periodic grids. This limitation can be attributed to the spatial constraint restricting the number of unit cells in a finite size domain and, as a consequence, in a limit on the longest wavelength (lowest frequency) affected by the periodic ABH metastructure. It appears that, while ABH metastructures exhibit interesting features capable of extending the performance of passive vibration attenuation methodologies towards the lower end of the frequency spectrum, the intrinsic dependence of the performance of ABH periodic structures on the spatial periodicity and on the dimensions of the unit cell (hence of the individual ABH) is still a limiting factor to achieve satisfactory performance in the low frequency regime, or otherwise known as being below a cut-off frequency.

An opportunity to overcome this latter limitation is offered by the concept of intentional nonlocality that was recently introduced and explored in the context of elastic metasurfaces. Generally speaking, the concept of nonlocal actions is very general and applies to many different branches of physics. At its core, the nonlocal response of a system builds upon the concept of action at a distance which means that the response of the system at a point depends on the state of the system at distant points. In nonlocal elasticity, this concept could be stated observing that the state of stress at a point of a continuum is affected by the distribution of strain at distant points. While different areas of applications (e.g., molecular mechanics or microcontinuum theories) can approach this concept from different perspectives and by using different mathematical tools, the overall concept remain unchanged independently of the length scale of the system.

Previous studies also showed that the introduction of macroscopic nonlocal forces could lead to effective elastic material properties of the metasurface that are functions of both wavelength and frequency. This dependence could be exploited to achieve a remarkably broadband operating range. While the metasurface operated in a much different frequency range, compared to the current ABH metastructure, the operating wavelength was still significantly larger than the characteristic width of the metasurface, hence dictating deeply subwavelength operating conditions. Considering that, in the low frequency range, also the ABH metastructure operates under subwavelength conditions, it is expected that a similar concept of intentional nonlocality could be applicable to ABH metastructures and significantly expand their operating dynamic range.

Accordingly, there is a continuing need for a vibration attenuation system that is configured to attenuate vibrations in a passive manner. Desirably, the vibration attenuation system may be configured to attenuate low-frequency vibrations.

SUMMARY

In concordance with the instant disclosure, a vibration attenuation system that is configured to attenuate vibrations in a passive manner, has surprisingly been discovered. Desirably, the nonlocal acoustic black hole metastructure system may attenuate vibrations in a broad low-frequency range.

The vibration attenuation system includes a load bearing layer, a non-load bearing layer, and a rigid beam connector. In a specific example, the non-load bearing layer may be flexible. The load bearing layer may have a first density and a first stiffness. The non-load bearing layer may have a second density and a second stiffness, the second density may be lower the first density. The rigid beam connector may have a third density and a third stiffness. In a more specific example, the rigid beam connector may be constructed from an available material with the lowest density and the highest stiffness when compared to the first density and stiffness and/or the second density and stiffness. The rigid beam connector couples the load bearing layer to the non-load bearing layer. The coupling of the non-load bearing layer to the load bearing layer through the use of the rigid beam connector may provide a nonlocal connection to transfer energy from the load bearing layer to the non-load bearing layer.

Various ways of using the vibration attenuation system are provided. For instance, a method may include a step of providing a load bearing layer, a non-load bearing layer, and a rigid beam connector. The load bearing layer may have a first density and a first stiffness. The non-load bearing layer may have a second density and a second stiffness. The rigid beam connector may have a third density and a third stiffness. The rigid beam connector may couple the load bearing layer to the non-load bearing layer. In a specific example, the rigid beam connector may couple an Acoustic Black Hole (ABH) metastructure of the load bearing layer to the non-load bearing layer. An external load-induced vibration may be accepted in the load bearing layer. The vibration energy may then be transferred through the rigid beam connector to the non-load bearing layer. Next, the vibration may be localized in the non-load bearing and attenuated using viscoelastic damping layers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 1:
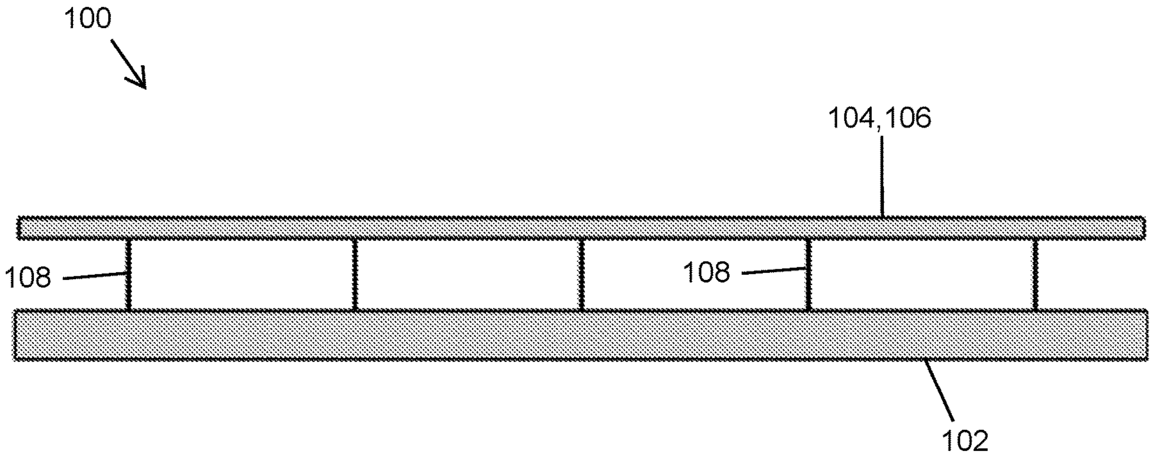
FIG. 1 is a schematic cross-sectional view of a nonlocal acoustic black hole metastructure based vibration attenuation system, further depicting non-load bearing layer, a rigid connector, and a load bearing layer, both the non-load bearing layer and the load bearing layer are provided as flat plates, according to one embodiment of the present disclosure.
Figure 5:
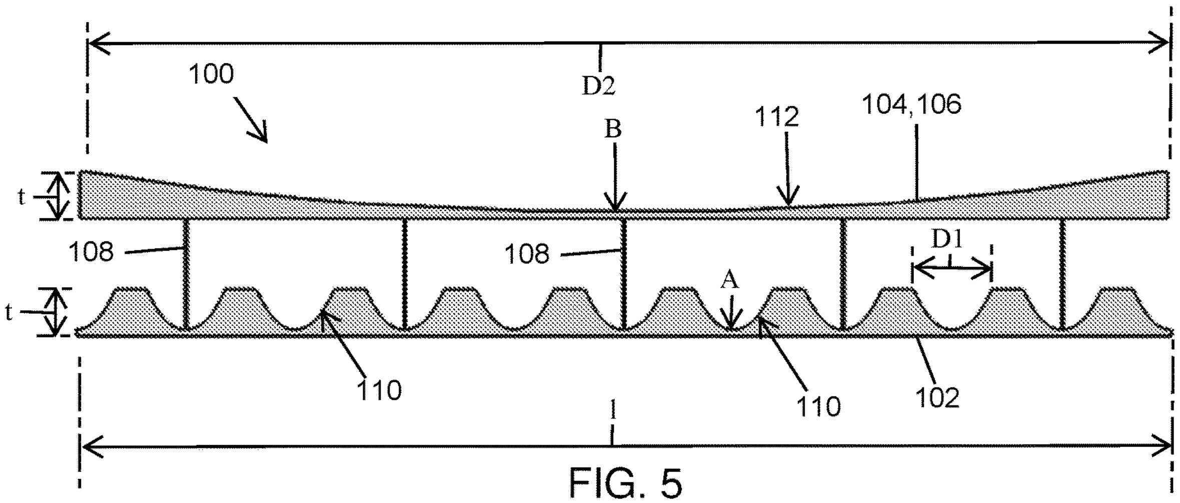
Figure 6:
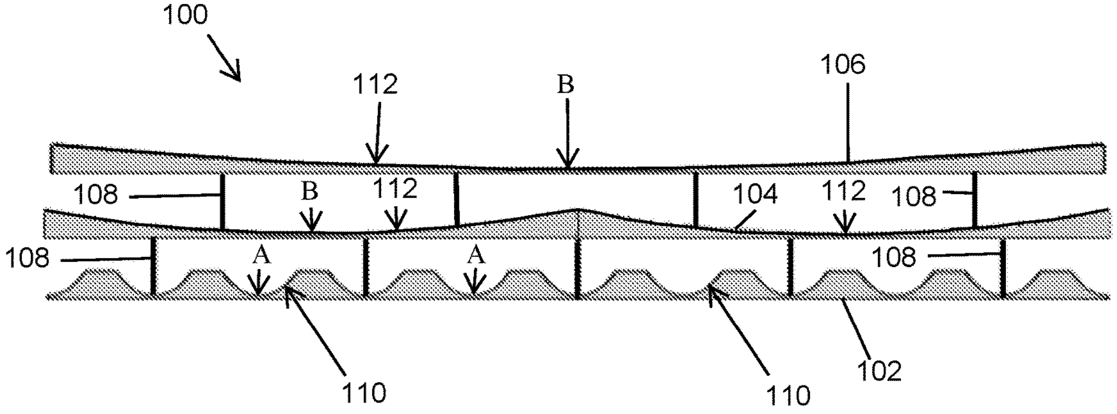
Figure 7:
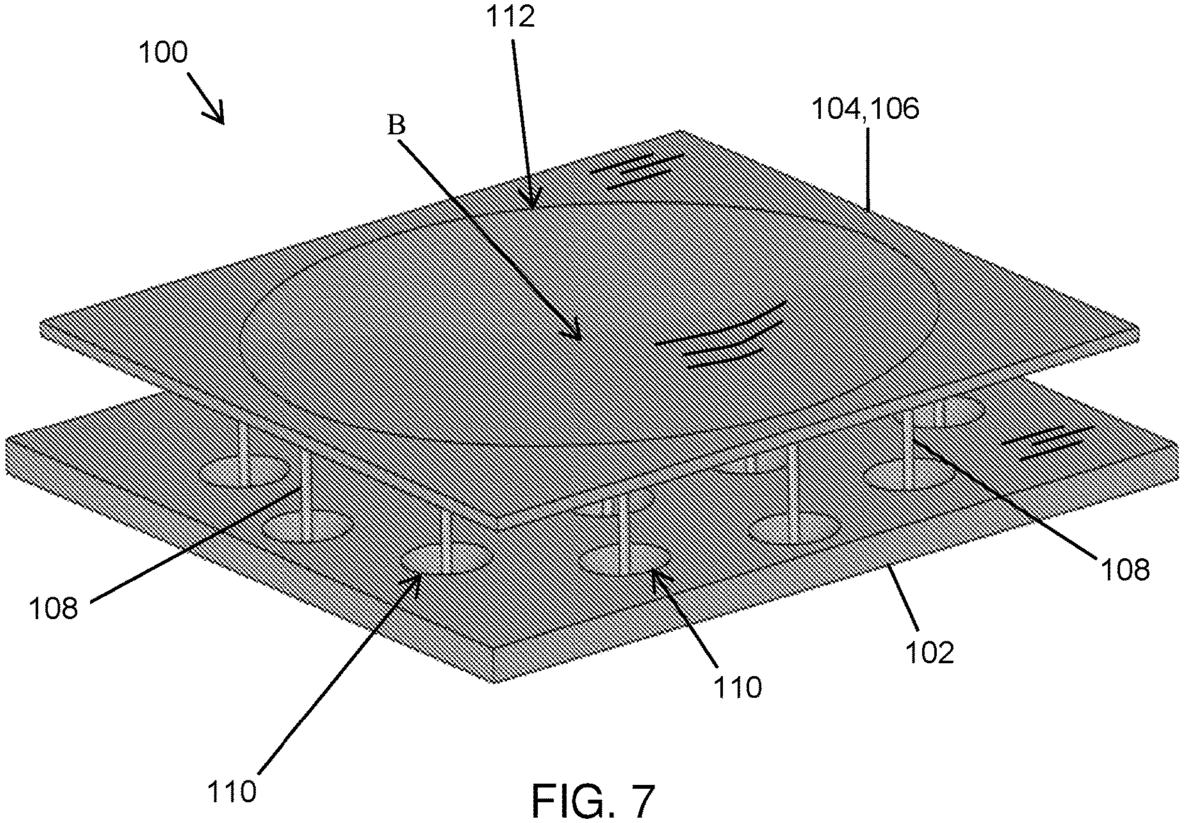
Figure 8:
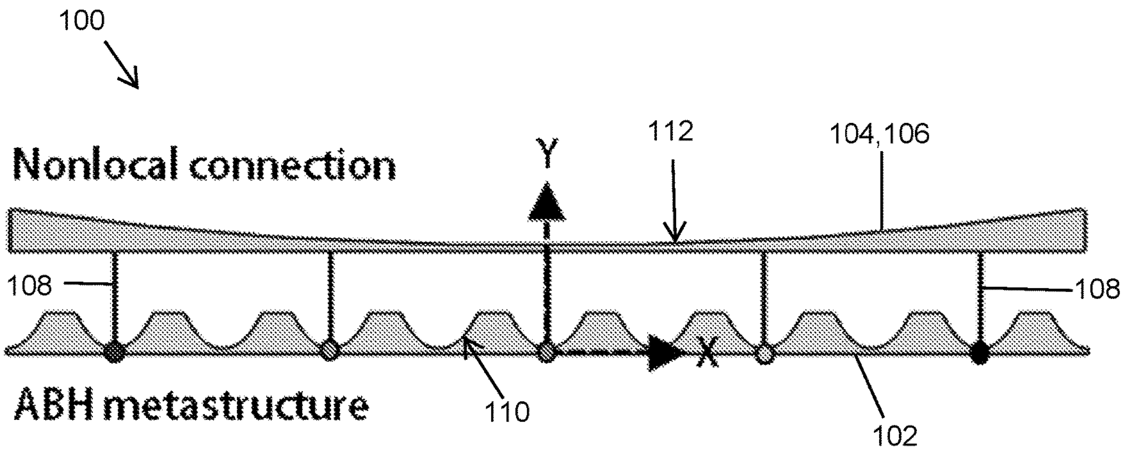
Figure 9:
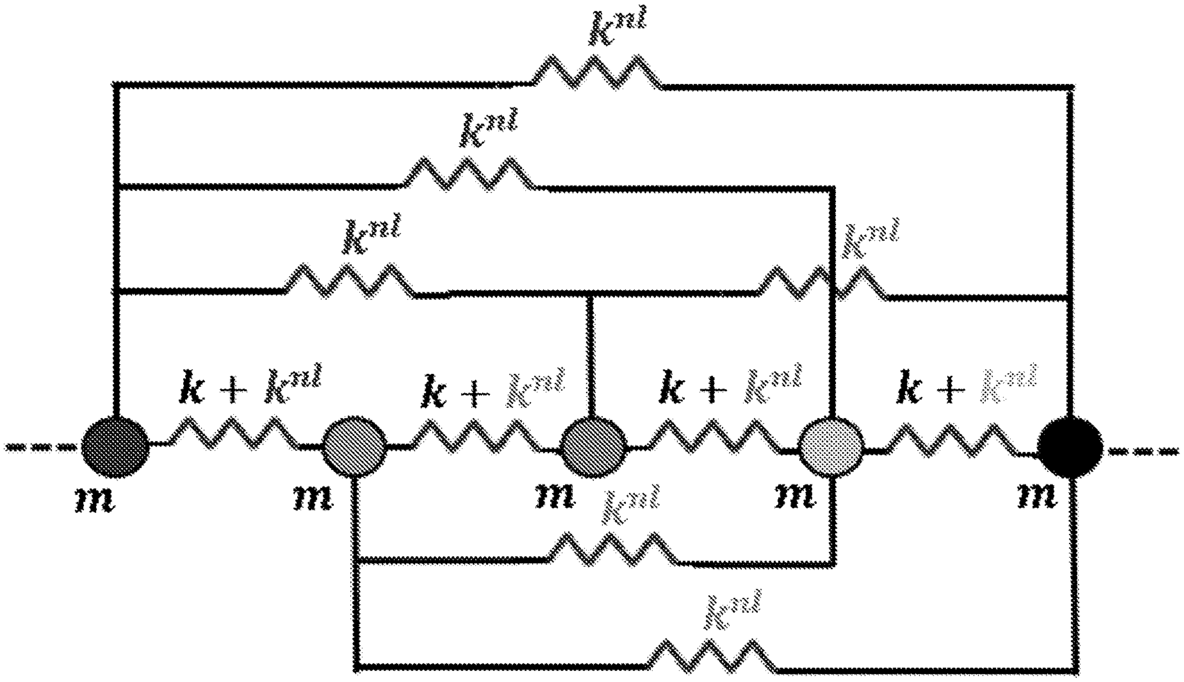
Figure 10:
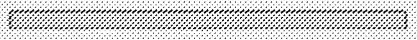
Figure 10:
Figure 10:
Figure 10:
Figure 10:
Figure 10:
Figure 13:
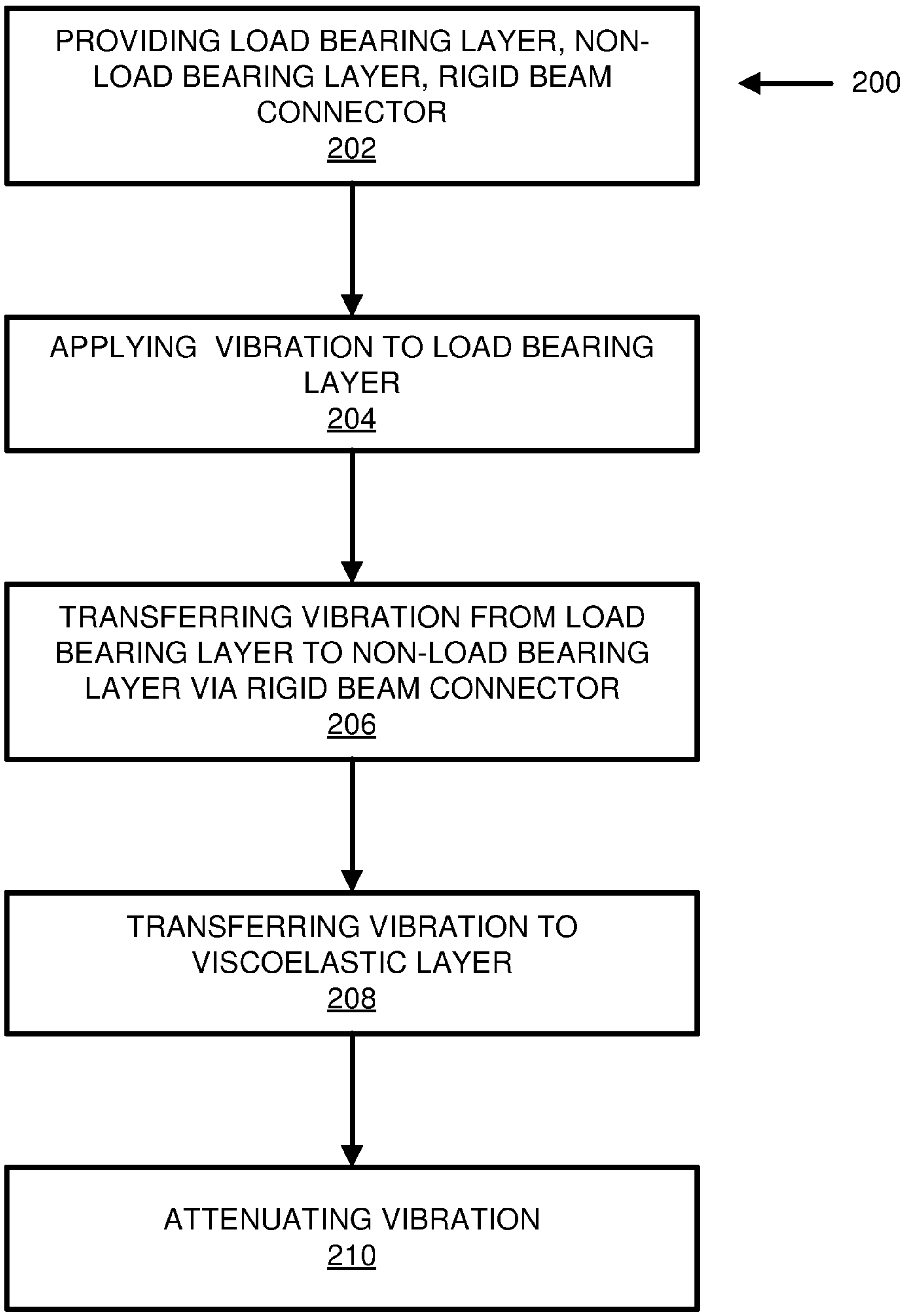

FIG. 5 is a schematic cross-sectional view of the nonlocal acoustic black hole metastructure based vibration attenuation system, as shown in FIG. 1, further depicting where the non-load bearing layer includes an ABH metastructure shaped as a concave surface in the non-load bearing layer and the load bearing layer includes an ABH metastructure shaped as a plurality of tapers in the load bearing layer, according to one embodiment of the present disclosure;

FIG. 6 is a schematic cross-sectional view of the nonlocal acoustic black hole metastructure based vibration attenuation system, as shown in FIG. 5, further depicting where the non-load bear layer includes a primary non-load bearing layer and a secondary non-load bearing layer, according to one embodiment of the present disclosure;

FIG. 7 is a top perspective view of the nonlocal acoustic black hole metastructure based vibration attenuation system, as shown in FIG. 5, according to one embodiment of the present disclosure;

FIG. 8 is a schematic cross-sectional view of a nonlocal acoustic black hole metastructure based vibration attenuation system, further depicting an ABH metastructure of the load bearing layer is non-locally coupled to an ABH metastructure of the non-load bearing layer, according to one embodiment of the present disclosure;

FIG. 9 is a schematic diagram of a 1D discrete model illustrating a non-limiting example of a nonlocal ABH metastructure, as shown in FIG. 8, further depicting where k represents a stiffness of local interactions between the nearest-neighbor masses, while $k^{nl}$ indicates the stiffness corresponding to the nonlocal interactions, according to one embodiment of the present disclosure;

FIG. 10 is a table illustrating a summary of the different design nomenclature for the ABH metastructure based vibration attenuation system elements;

FIG. 11 is a table illustrating non-limiting material properties of the load bearing layer (LBL), the non-load bearing layer (NLBL), the rigid beam connectors (connector), and the viscoelastic layer used in the geometric configurations, further depicting the relatively large Young's modulus of the connectors compared with that of the layers results is used to implement its rigid behavior compared to the layers, according to one embodiment of the present disclosure;

FIG. 12 is a table illustrating a non-limiting summary of the physical dimensions of the LBL, the NLBL, the connector, and the viscoelastic layer used for the different configurations, according to one embodiment of the present disclosure;

FIG. 13 is a flowchart of a method for using the vibration attenuation system, according to one embodiment of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10, 2-8,2-3,3-10,3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIG. is turned over, elements described as "below," or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIGS. 1-8, the vibration attenuation system 100 includes a load bearing layer 102, a non-load bearing layer 104, 106, and a rigid and/or very stiff beam connector 108. In a specific example, the non-load bearing layer 104, 106 may be flexible. The load bearing layer 102 may have a first density and a first stiffness. The non-load bearing layer 104, 106 may have a second density and a second stiffness. The rigid beam connector 108 may have a third density and a third stiffness. The rigid beam connector 108 may couple the load bearing layer 102 to the non-load bearing layer 104, 106. The coupling of the non-load bearing layer 104, 106 to the load bearing layer 102 through the use of the rigid beam connector 108 may provide a nonlocal connection to transfer energy from the load bearing layer 102 to the non-load bearing layer 104, 106.

A possible idealized 1D discrete model of the nonlocal Acoustic Black Hole (ABH) metastructure is illustrated in FIG. 9. An ABH metastructure may be understood as a tapered element able to deform and, eventually, trap acoustic waves. This simplified model is intended to help understanding the role of long-range interactions. "k" represents the stiffness of local interactions between nearest-neighbor masses, while "$k^{nl}$" indicates the stiffness corresponding to the nonlocal interactions. Different contributions are shaded differently to facilitate the conceptual analogy with the continuous model in FIG. 8. The nonlocal ABH metastructure has a symmetric nonlocal horizon about the center, corresponding to the center mass in the discrete model. Although there is no prescription for the horizon of nonlocality to be symmetric.

Figure 2:
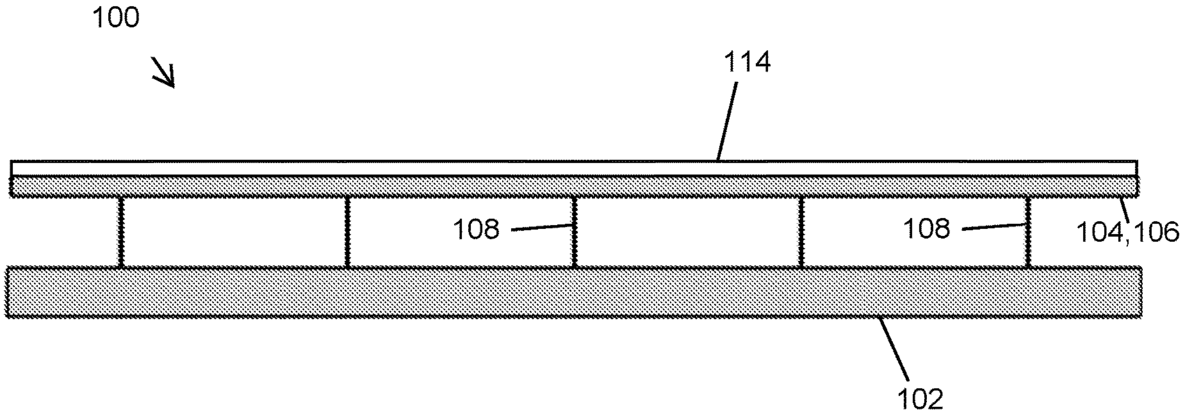
FIG. 2 is another schematic cross-sectional view of the nonlocal acoustic black hole metastructure based vibration attenuation system, as shown in FIG. 1, further depicting a viscoelastic layer coupled to the non-load bearing layer, according to one embodiment of the present disclosure.
Figure 3:
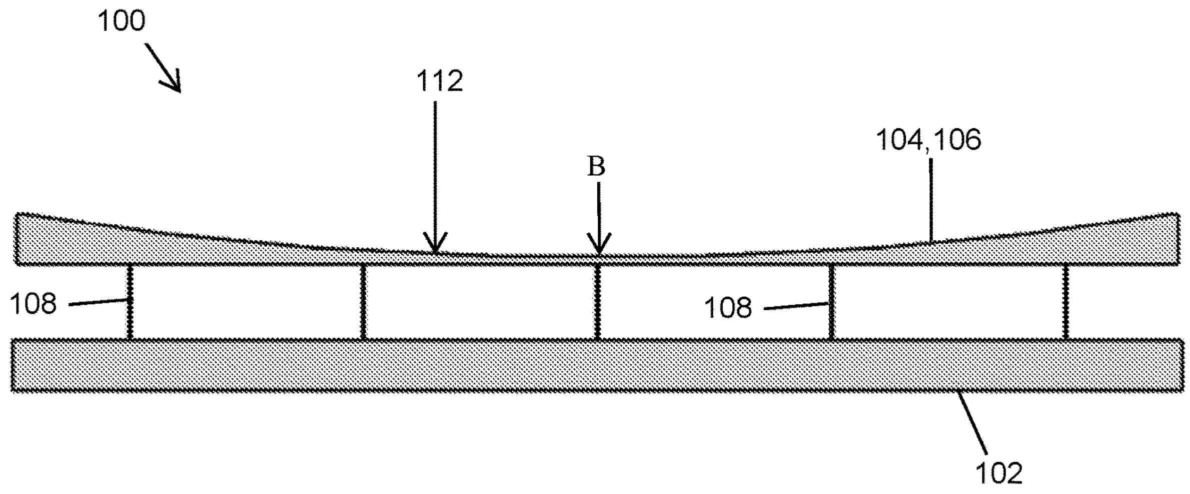
FIG. 3 is a schematic cross-sectional view of the nonlocal acoustic black hole metastructure based vibration attenuation system, as shown in FIG. 1, further depicting where the non-load bearing layer includes an ABH metastructure shaped as a concave surface in the non-load bearing layer, according to one embodiment of the present disclosure.
Figure 4:
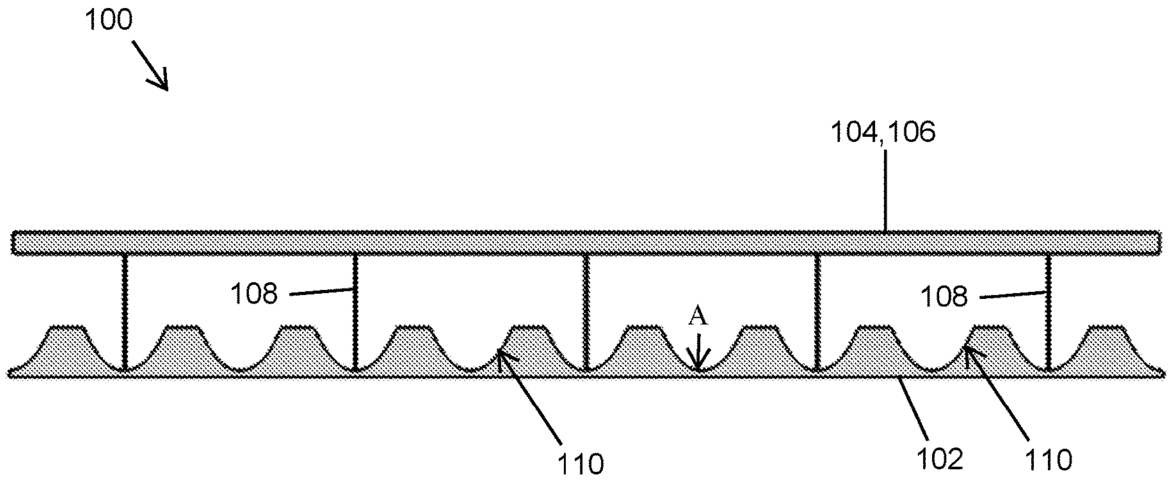
FIG. 4 is a schematic cross-sectional view of the nonlocal acoustic black hole metastructure based vibration attenuation system, as shown in FIG. 1, further depicting where the load bearing layer includes an ABH metastructure shaped as a plurality of tapers in the load bearing layer, according to one embodiment of the present disclosure.

The vibration attenuation system 100 may include various ways to attenuate a vibration while maintaining the strength of the load bearing layer 102. For instance, the second density may be less than the first density. In a more specific non-limiting example, the third density may be less than the first density. In a specific example, the third stiffness of the rigid beam connector 108 may be greater than each of the first stiffness of the load bearing layer 102 and the second stiffness of the non-load bearing layer 104, 106. In a more specific example, the first stiffness of the load bearing layer 102 may be greater than the second stiffness of the non-load bearing layer 104, 106, yet still lesser than the third stiffness of the rigid beam connector 108. Additionally, the shape of the vibration attenuation system 100 may be configured to further attenuate a vibration. The load bearing layer 102 may be a primary thin-walled structure for which broadband vibration attenuation performance is sought. As shown in FIGS. 1-3, the load bearing layer may be provided as a flat-surfaced plate. As shown in FIGS. 4-8, the load bearing layer may be provided as a tapered plate. In a specific example, the flat-surfaced plate may include a thin rectangular flat plate with $t/l<0.1$, where l is length and t is thickness. This structure has constant thickness and no tailoring. In an alternative example, the tapered plate may include a thin rectangular plate with a load bearing layer Acoustic Black Hole (ABH) 110 provided as a taper 110. In a specific example, the tapered plate may include an embedded lattice of periodic tapers 110. As a non-limiting example, the embedded lattice may include around ten periodic tapers 110. The thickness outside of the tapers 110 (i.e., the maximum plate thickness) is t, and the length is l. Each taper 110 may also include a first diameter D1. The number of tapers 110 per unit length may also be affected by the diameter of each acoustic black hole (ABH) that could be selected based on considerations purely related to the wavelength versus the ABH diameter. Additionally, from a structural perspective, the use of a single taper 110 in the load bearing layer 102 would result in regions with low t/l ratio, which might not be ideal for structural stiffness and integrity. The taper 110 may be configured localize a baseline energy on the nonlocal, non-load bearing layer 104, 106. In an even more specific example, a terminal end of the rigid beam connector 108 may be connected to an apex A of the taper 110. As non-limiting examples, FIGS. 11-12 illustrate notable characteristics of the different configurations of the vibration attenuation system 100. One skilled in the art may select other suitable shapes, sizes, and densities to form the vibration attenuation system 100, within the scope of the present disclosure.

In certain circumstances, the non-load bearing layer 104, 106 may be configured to control the distribution of nonlocal forces. As shown in FIGS. 1-2, 4, and 10, the non-load bearing layer 104, 106 may include a substantially flat-surfaced plate. The substantially flat-surfaced plate may be understood as an evenly surfaced substrate, such as not including a taper. It is contemplated the substantially flat-surfaced plate may have an overall shape that is flat and/or curved. As shown in FIGS. 3, 5-8, and 10, in an alternative example, a surface of the non-load bearing layer 104, 106 may include a non-load bearing layer Acoustic Black Hole (ABH) 112, such as a concave surface 112. Advantageously, the dissipation of vibrations may be enhanced where a surface of the non-load bearing layer 104, 106 includes a non-load bearing layer ABH 112. The non-load bearing layer ABH 112 may include a substantially concave surface 112 or other shapes and operating principles. In a specific example, the non-load bearing layer 104, 106 may include a plurality of ABH 112 structures, such as a plurality of concave structures in the surface of the non-load bearing layer 104, 106. The specific geometry of the non-load bearing layer 104, 106, namely its length and tapering configuration, with the rigid beam connectors 108 may control the distribution of the forces and the overall horizon of nonlocality. The substantially concave surface 112 may also include a second diameter D2. Provided as a non-limiting example, the second diameter D2 of the substantially concave surface 112 may be greater than the first diameter D1 of each of the tapers 110. One skilled in the art may select different geometries to further tailor the effect of different tapering strategies, within the scope of the present disclosure. It is anticipated that a non-load bearing layer 104, 106 integrating ABH structures may offer enhanced energy attenuation capabilities in the low frequency regime.

As shown in FIG. 6, the non-load bearing layer 104, 106 may include a primary non-load bearing layer 104 and a secondary non-load bearing layer 106. It should be appreciated that any number of non-load bearing layers 104, 106 are contemplated to provide further attenuation. The primary non-load bearing layer 104 may be substantially disposed between the load bearing layer 102 and the secondary non-load bearing layer 106. In an even more specific example, each of the primary non-load bearing layer 104 and the secondary non-load bearing layer 106 may include an ABH, which may include a substantially concave surface 112. A bottom-most point B of the ABH of the primary non-load bearing layer 104 may be substantially offset from a bottom-most point B of the ABH of the secondary non-load bearing layer 106. Without being bound to any particular theory, it is believed where the bottom-most point B of the primary non-load bearing layer 104 is offset from the bottom-most point B of the secondary non-load bearing layer 106, the vibration attenuation performance of the vibration attenuation system 100 may be enhanced. It is also contemplated that when using a plurality of non-load bearing layers 104, 106, the distribution of density may not be monotonic across the plurality of non-load bearing layers 104, 106. Alternatively, the plurality of non-load bearing layers 104, 106 may also share the same density.

The non-load bearing layer 104, 106 may be connected to the load bearing layer 102 by the rigid beam connectors 108. In a practical implementation, the rigid beam connectors 108 may be designed as structural linkages having significantly higher stiffness compared to the layers 102, 104, 106, for example, a ratio of E of connector: ELBL=12:1. Here, E is Young's modulus between the load bearing layer 102 and the supporting structure. Their spacing influences where the nonlocal forces mediated by the non-load bearing layer 104, 106 are transferred to the load bearing layer 102. Both the number and location of these rigid beam connectors 108 may be treated as design variables whose values would be obtained by means of an optimization approach. From a more qualitative perspective, these links allow the vibrational energy to flow between the two layers 102, 104, 106, hence it is reasonable to locate these rigid beam connectors 108 close to structural locations on the load bearing layer 102 with high energy density. Equivalently, given that nonlocal forces are driven by the state of strain within the horizon of nonlocality, rigid beam connectors 108 may be optimally located in regions with high strain energy density. As a non-limiting example, the center points of ABH tapers 110 (known to be points with high energy density) may be optimal locations of interest to place the rigid beam connectors 108. One skilled in the art may select other suitable number, locations, or positions for the rigid beam connector 108, within the scope of the present disclosure.

In certain circumstances, the non-load bearing layer 104, 106 may include a viscoelastic layer 114 configured to further dampen and/or attenuate the vibration. In a specific example, the viscoelastic layer 114 may be disposed on the non-load bearing ABH 112 of the non-load bearing layer 104, 106 to attenuate the localized energy in the non-load bearing layer 104, 106. It is contemplated that a plurality of viscoelastic layers 114 may be utilized on the non-load bearing layer 104, 106. The viscoelastic layer 114 may be constructed from any viscoelastic/dampening materials, such as rubber and/or polyurethane. In another specific example, the viscoelastic layer 114 may be disposed on the load bearing layer 102. In a more specific example, the viscoelastic layer 114 may include a plurality of viscoelastic layers 114 disposed on the load bearing layer 102. In an even more specific example, the viscoelastic layer 114 may be disposed on each of the load bearing layer 102 and the non-load bearing layer 104, 106. One skilled in the art may select other suitable materials to construct the viscoelastic layer 114, within the scope of the present disclosure.

Various ways of using the vibration attenuation system 100 are provided. For instance, as shown in FIG. 13, a method 200 may include a step 202 of providing a load bearing layer 102, a non-load bearing layer 104, 106, and a rigid beam connector 108. The load bearing layer 102 may have a first density. The non-load bearing layer 104, 106 may have a second density. The rigid beam connector 108 may have a third density. The rigid beam connector 108 may couple the load bearing layer 102 to the non-load bearing layer 104, 106. A vibration induced by the application of an external force may be accepted in the load bearing layer 102. The vibration may then be transferred through the rigid beam connector 108 to the non-load bearing layer 104, 106. Next, the vibration may be attenuated. In certain circumstances, a surface of the load bearing layer 102 may include a taper 110, and the step 206 of transferring the vibration includes directing the vibration to an apex A of the taper 110. In a specific example, a surface of the non-load bearing layer 104, 106 may include a substantially concave surface 112, and the step 206 of transferring the vibration includes directing the vibration to a bottom-most point B of the concave surface 112. In another specific example, the non-load bearing layer 104, 106 may include a viscoelastic layer 114, and the vibration may be transferred to the viscoelastic layer 114 to enhance the attenuation of the vibration.

Advantageously, the vibration attenuation system 100 utilizes intentional nonlocality to improve the broadband and low frequency attenuation performance of ABH metastructures 112, 114. In a specific example, the nonlocal design integrates a local ABH metastructure, which leverages multiple periodic ABH tapers 110, with additional flexible layers 104, 106 intentionally introduced to achieve a nonlocal dynamic behavior. The new structural design implements, at the macroscopic scale, an equivalent concept of action at a distance typically seen in systems with prominent scale effects. In linear elasticity, the traditional material nonlocality is mathematically defined as a function of the location-dependent nonlocal attenuation function. However, as the nonlocal behavior of the vibration attenuation system 100 was achieved by using geometrically tailored physical connections, a semi-analytical methodology was developed to extract the effective dynamic nonlocal attenuation functions endowed with both spatial and temporal dependence. The qualitative agreement between the semi-analytical and the numerical dispersion structure of an infinite nonlocal ABH metastructure allowed validating the semi-analytical technique. While this method could certainly be useful to obtain homogenized models of large-scale nonlocal ABH metastructures, in the present disclosure its development was motivated by the understanding of the effects that different design parameters have on the occurrence of the nonlocal behavior.

In a specific, non-limiting example, the additional nonlocal layer (the non-load bearing layer 104, 106) may increase the overall weight of the system 100 by around fifteen percent for a flat plate configuration and around twenty six percent for a tapered/concave surface plate configuration. However, with continued reference to the non-limiting example, an average reduction of around twenty-seven percent for a nonlocal flat plate configuration and around forty percent for a nonlocal tapered/concave surface plate configuration in the steady state response amplitude was obtained for the nonlocal design in the low-frequency range. Accordingly, the results clearly indicate that the vibration response of ABH metastructures can be significantly attenuated via the nonlocal design.

Another very remarkable effect is observed on the position of the first frequency bandgap. In another specific, non-limiting example, the local ABH metastructure (tapered load bearing plate 102) may present a first bandgap around 170 Hz (center frequency), the nonlocal design can reduce its center frequency to approximately 2 Hz (a 98% reduction). The width and location of the bandgaps at low frequencies could be tuned by selecting the type of non-load bearing layer 104, 106 and its geometrical parameters. The present disclosure particularly describes how the combination of intentional (macroscopic) nonlocality and of ABH technology can achieve very low frequency bandgaps without compromising the structural integrity of the system 100. Desirably, this characteristic can be very useful for structural dynamics applications and passive vibration control.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A vibration attenuation system, comprising:

a load bearing layer having a first density and a first stiffness;

a non-load bearing layer having a second density and a second stiffness, wherein the non-load bearing layer includes a primary non-load bearing layer and a secondary non-load bearing layer, the primary non-load bearing layer is substantially disposed between the load bearing layer and the secondary non-load bearing layer; and a rigid beam connector having a third density and a third stiffness, the rigid beam connector couples the load bearing layer to the non-load bearing layer, the third density is different from each of the first density and the second density;

wherein each of the primary non-load bearing layer and the secondary non-load bearing layer include a concave surface, a bottom-most point of the concave surface of the primary non-load bearing layer is substantially offset from a bottom-most point of the concave surface of the secondary non-load bearing layer.

2. The vibration attenuation system of claim 1, wherein the third stiffness is greater than each of the first stiffness and the second stiffness.

3. The vibration attenuation system of claim 1, wherein the third density is less than each of the first density and the second density.

4. The vibration attenuation system of claim 1, wherein the load bearing layer is a substantially flat-surfaced plate.

5. The vibration attenuation system of claim 1, wherein a surface of the load bearing layer includes a taper.

6. The vibration attenuation system of claim 5, wherein the surface of the load bearing layer includes a plurality of tapers.

7. The vibration attenuation system of claim 5, wherein a terminal end of the rigid beam connector is coupled to an apex of the taper.

8. The vibration attenuation system of claim 1, wherein the non-load bearing layer is a substantially flat-surfaced plate.

9. The vibration attenuation system of claim 1, wherein a surface of the non-load bearing layer includes a substantially concave surface.

10. The vibration attenuation system of claim 1, wherein the non-load bearing layer is flexible.

11. The vibration attenuation system of claim 1, further comprising a viscoelastic layer coupled to the non-load bearing layer, the viscoelastic layer is configured to attenuate localized energy in the non-load bearing layer.

12. The vibration attenuation system of claim 11, wherein the viscoelastic layer is constructed from at least one of rubber and polyurethane.

13. The vibration attenuation system of claim 1, wherein a surface of the load bearing layer includes a taper having a first diameter and a surface of the non-load bearing layer includes a substantially concave surface having a second diameter, and the second diameter is greater than the first diameter.

14. A method of using a vibration attenuation system to dissipate a vibration, the method comprising the steps of:

providing a load bearing layer, a non-load bearing layer, and a rigid beam connector, the load bearing layer having a first density, the non-load bearing layer having a second density, the rigid beam connector having a third density, the rigid beam connector coupling the load bearing layer to the non-load bearing layer, and the third density is different from each of the first density and the second density, wherein the non-load bearing layer includes a primary non-load bearing layer and a secondary non-load bearing layer, the primary non-load bearing layer is substantially disposed between the load bearing layer and the secondary non-load bearing layer, and wherein each of the primary non-load bearing layer and the secondary non-load bearing layer include a concave surface, a bottom-most point of the concave surface of the primary non-load bearing layer is substantially offset from a bottom-most point of the concave surface of the secondary non-load bearing layer;

applying a vibration to the load bearing layer;

transferring the vibration from the load bearing layer to the non-load bearing layer; and attenuating the vibration.

15. The method of claim 14, wherein the vibration is transferred from the load bearing layer to non-load bearing layer via the rigid beam connector.

16. The method of claim 14, wherein a surface of the load bearing layer includes a taper, the step of transferring the vibration includes directing the vibration to an apex of the taper.

17. The method of claim 14, wherein a surface of the non-load bearing layer includes a substantially concave surface, the step of transferring the vibration includes directing the vibration to a bottom-most point of the concave surface.

18. The method of claim 14, wherein the non-load bearing layer further includes a viscoelastic layer, and the energy of the vibration is dampened by the viscoelastic layer.

19. A vibration attenuation system, comprising:

a load bearing layer having a first density and a first stiffness;

a non-load bearing layer having a second density and a second stiffness, wherein a surface of the load bearing layer includes a taper having a first diameter and a surface of the non-load bearing layer includes a substantially concave surface having a second diameter, and the second diameter is greater than the first diameter; and a rigid beam connector having a third density and a third stiffness, the rigid beam connector couples the load bearing layer to the non-load bearing layer, the third density is different from each of the first density and the second density.

* * * * *